(12) United States Patent
Shafirstein et al.

(10) Patent No.: US 7,853,089 B2
(45) Date of Patent: Dec. 14, 2010

(54) IMAGE PROCESSING APPARATUS AND METHOD FOR HISTOLOGICAL ANALYSIS

(75) Inventors: Gal Shafirstein, Little Rock, AR (US); Xiaowei Xu, Little Rock, AR (US); Mutlu Mete, Little Rock, AR (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 961 days.

(21) Appl. No.: 11/711,738

(22) Filed: Feb. 27, 2007

(65) Prior Publication Data

US 2008/0205776 A1 Aug. 28, 2008

(51) Int. Cl.
*G06K 9/36* (2006.01)
(52) U.S. Cl. .................. 382/232; 128/922; 128/925; 382/128; 382/131; 382/154; 382/286; 600/473; 600/439; 600/421; 600/567; 378/15; 378/62; 378/63
(58) Field of Classification Search .......... 386/128, 386/131, 154, 263–266, 286, 232; 600/473, 600/439, 421, 567, 374; 606/21, 27; 378/15, 378/62–63; 128/922–925
See application file for complete search history.

(56) References Cited

U.S. PATENT DOCUMENTS

| 5,151,795 | A |   | 9/1992 | Adachi |
|---|---|---|---|---|
| 6,026,174 | A | * | 2/2000 | Palcic et al. ............ 382/133 |
| 6,738,500 | B2 |   | 5/2004 | Bankman et al. |
| 7,027,627 | B2 | * | 4/2006 | Levin et al. ............ 382/128 |
| 7,769,432 | B2 | * | 8/2010 | Klimberg et al. ........ 600/473 |
| 7,783,092 | B2 | * | 8/2010 | Agam et al. ............ 382/128 |
| 2001/0033680 | A1 |   | 10/2001 | Bankman et al. |
| 2002/0054697 | A1 |   | 5/2002 | Wang |
| 2003/0194115 | A1 |   | 10/2003 | Kaufhold et al. |
| 2003/0231790 | A1 |   | 12/2003 | Bottema |
| 2004/0066956 | A1 |   | 4/2004 | Ashton |
| 2004/0068167 | A1 |   | 4/2004 | Hsieh et al. |
| 2004/0146204 | A1 |   | 7/2004 | Ashton |
| 2004/0247166 | A1 |   | 12/2004 | Giger et al. |
| 2005/0096530 | A1 |   | 5/2005 | Daw et al. |
| 2005/0113679 | A1 |   | 5/2005 | Suryanarayanan et al. |
| 2005/0123181 | A1 |   | 6/2005 | Freund et al. |
| 2005/0123185 | A1 |   | 6/2005 | Balasubramanian et al. |

OTHER PUBLICATIONS

Ester, Martin et al., "A Density-Based Algorithm for Discovering Clusters in Large Spatial Databases with Noise," Proc. 2nd Intl. Conf. on Knowledge Discovery and Data Mining (KDD-96).

Xu, Xiaowei and Kriegel, Jochen Jäger Hans-Peter, "A Fast Parallel Clustering Algorithm for Large Spatial Databases," Data Mining and Knowledge Discovery (Kluwer Academic 1999).

\* cited by examiner

*Primary Examiner*—Wesley Tucker
*Assistant Examiner*—Nancy Bitar
(74) *Attorney, Agent, or Firm*—J. Charles Dougherty

(57) ABSTRACT

An automated method for analyzing whether all cancerous or abnormal tissue has been removed as a result of surgical resection is disclosed. A number of tissue section slides are prepared representing all or a relatively large percentage of the tissue sample, and high-resolution digital microscopic images are formed of the sections. A clustering algorithm forms an image showing the healthy tissue margins, such representation being stored in a file of significantly smaller size than the original photograph. These two-dimensional image files may be formed into a three-dimensional image of the entire resected tissue, thereby improving the accuracy and ease by which a pathologist may determine if further surgery or radiation therapy, for example, are indicated.

18 Claims, 1 Drawing Sheet

IMAGE PROCESSING APPARATUS AND METHOD FOR HISTOLOGICAL ANALYSIS

BACKGROUND OF THE INVENTION

The present invention relates to image processing, and in particular to an apparatus and method for image processing for the analysis of histological samples, such as slide sections prepared following the resection of a tumor or other neoplastic lesion.

When removing a cancerous tumor or other type of lesion, it is desirable to remove as little healthy tissue as possible while ensuring that all of the abnormal or cancerous tissue is removed. Metastasis may occur if malignant cells are missed. Thus in order to assess the success of a surgical procedure to remove a lesion, it is the usual practice among hospitals today to inspect the resected tissue following surgery. This inspection is performed by checking to see that healthy tissue is present at all margins of the tissue. Tumor-free margins at the surgical site offers the best chance for the patient to avoid local recurrence of cancer following tumor resection. In 40 to 50% of all cancer cases, however, local recurrence does in fact occur due to inadequate margins.

The current practice for assessing tumor margin relies heavily upon a histological analysis typically performed by a pathologist. Slides are prepared by sectioning the tissue, and these slides are then visually assessed by the pathologist. The pathologist looks for indications of isolated cancerous or abnormal cells at the margins. Using current technology, isolated islands of malignant cells may only be observed via direct microscopic evaluation of ex vivo tissue. Any alternative technique for examining tumor margin, such as using images prepared from the tissue slides, would require that the images be of sufficiently high resolution to resolve individual malignant cells. Imaging techniques such as sonography, digital mammography, and magnetic resonance, for example, do not produce images of sufficient resolution to identify single malignant cells in a tissue sample.

Microscopic evaluation of resected tissue requires the preparation and examination of a number of tissue slides. The slides each contain a cross-section that is cut across the tissue sample. In the simplest case of a biopsy requiring the assessment of surgical margins, the technician or pathologist assistant will usually identify the margins grossly and paint them with an insoluble dye such as India ink. Other cases, such as breast cancer lesions, for example, require a much more complex preparation and examination procedure. Excised breast tumors typically undergo a rigorous protocol including but not limited to an examination of the gross specimen with comparison to radiographic images; touch preparations of all surgical margins; inking of surgical margins with specific colors corresponding to specific margins; serial sectioning of the specimen; and measuring of the distance of the tumor to the closest surgical margin at all sides for each section.

Even with the complex procedure used for post-surgical inspection of breast cancer lesions as described above, it is still impossible to know with absolute certainty that a lesion has been entirely resected. Touch preparations may yield false results. The inking of surgical margins is complicated and mistakes may occur. Perhaps the most significant source of error, however, is that only a relatively small portion of the specimen is being imaged in the sectioning protocol. In a typical sectioning regimen, only 6-12 slides having a thickness of about 5 μm are submitted for histological examination. Those sections are typically cut from the excised tissue at about 3 mm intervals. In some cases, however, as few as one section may be submitted, and conclusions are based upon the presence or absence of the lesion in that section and, if present, its distance from the surgical margin. Even in the case where 6-12 slides are submitted, such slides represent only a small fraction of the total volume of resected tissue. For example, supposing that a tissue sample containing a 2 cm round neoplasm is submitted, a total of up to eight histologic sections may be examined. Using specimens of 5 μm thickness, it may be seen that only about 40 μm of the total 2000 μm-thick neoplasm will be examined by the pathologist, representing only 2% of the total lesion.

Due to the limited number of slides prepared, the accuracy of the sectioning approach to post-surgical evaluation as described above relies upon the lesion being of reasonably regular shape. Many types of lesions, however, are known to take forms that are highly irregular or even discontinuous. Thus if the irregularity occurs in an interval between the regions that are prepared as slides, the pathologist may well miss the fact that a section of the tissue has no healthy margin, indicating that cancerous tissue remains behind at the region of the resection. Although simply increasing the number of slides that are prepared and reviewed by the pathologist would reduce the risk associated with this source of error, that alternative is generally not practical in a clinical setting. To view even a majority of the area of a tumor using a typical specimen size of 15×15×15 mm and using slides of 5 μm thickness, more than 200 slides per procedure must be viewed. This number of slides would occupy a pathologist for an entire working day. Even if enough pathologists were available to review such a large number of slides per procedure at most hospitals, the cost of this type of comprehensive review would be prohibitive.

The inventors hereof have investigated the use of high-resolution microscopic digital photographs as a replacement for the direct examination of tissue sections under the microscope. To be useful for histopathology, however, the digital photographs used would need to have a very high resolution, on the order of 54,000 pixels per inch or higher. At this resolution, a single image of a 15 mm×15 mm area would produce a digital file of a prohibitively large size of approximately 2.8 Gb. Microscope scanners are now available that provide the necessary resolution, some such devices producing images at up to 100,000 dpi. The inventors are unaware, however, of any commercially available software package capable of processing images of such a large size. The task is complicated by the large number of slides that must be examined per specimen in order to ensure that a sufficient percentage of the specimen is examined, and thereby achieve the greatest improvement of histopathology success. The computing resources typically available to most hospital pathology laboratories would, in any event, be insufficient to the task of timely processing the enormous amount of information contained in a series of high-resolution digital photographs as described.

A method of determining the margin of neoplastic lesions in resected tissue that utilizes a greater number of specimen slides for increased accuracy, and that does not require an increased period of pathologist histological review, is thus desired. Furthermore, such a method utilizing high-resolution digital photographs yet requiring no specialized computing equipment would also be desired.

SUMMARY OF THE INVENTION

The present invention is directed to an automated method to produce a series of two-dimensional representations or a three-dimensional representation of a lesion within a resected tissue specimen using microscopic photographs prepared from a relatively large number of histological sections. In order to overcome the difficulties created by the size of the file associated with each digital photograph, a clustering algorithm is applied to each image that converts the pixel-based image into lines and surfaces that may be described by mathematical expressions. The resulting file will be of much smaller size than the original digital photograph file, but will still contain essentially all data relevant to the issue of whether a margin of healthy tissue remains around the lesion in the resected tissue. By "stacking" multiple two-dimensional images produced from the digital photographs of each section, a three-dimensional image of the resected tissue may be formed. The algorithm preferably requires only a portion of the digital photograph file to be present in computer memory at any given time, thus lowering the memory requirements of the machine on which the algorithm is implemented. The process may, in some embodiments, be performed entirely with a personal computer or personal computer cluster as may be commonly found in a hospital or other clinical setting.

The image file or files resulting from the application of the present invention may be employed in various clinical applications requiring histological analysis, such as, in the case of neoplastic lesions, determining whether additional surgery or radiation therapy is indicated. Furthermore, the present invention may find application in the field of cancer research, particularly in the area of tumor angiogenesis as a cancer treatment.

In a preferred procedure according to the present invention, a high-resolution digital image is formed from a scanned tissue section. The resulting digital file is retained in a computer storage medium. The image is input into the cluster analysis algorithm, preferably line-by-line or otherwise in small sections or partitions, such that cancerous or abnormal cell areas in the image are identified. The boundaries of the cancerous or abnormal regions are then calculated, and a two-dimensional image file is produced for each slide that marks the regions of interest. Since the other information is removed from the resulting image, and the locations of the cancerous or abnormal regions are stored as a mathematical construct, the size of the image file is much smaller than the original digital photograph. As a result, large numbers of such files may preferably be stored on a typical personal computer or computer cluster storage medium. Such files may be easily loaded in their entirety into the memory space of a typical personal computer.

Once the image analysis process is complete for each slide, a three-dimensional image may in some embodiments of the present invention be formed by aligning the resulting images in the order as they correspond to the original tissue sections. Because the process is automated, a large number of slides may be used according to the present invention, and thus a much more complete picture of the margins in the resected tissue may be formed. The entire tissue in fact may be sectioned, scanned, and used to construct the resulting three-dimensional image, such that there is no risk of missing cancerous or abnormal cells outside of the identified boundary if such cells lay between the sections that otherwise would have been examined using prior art techniques.

It may be seen that the present invention, due to its automated nature, may produce a diagnosis of histological slides that is more rapid than traditional techniques that only examine a much smaller percentage of tissue. The entire process, moreover, may in certain embodiments be implemented as a real-time or near real-time analysis tool that would provide feedback to a surgeon concerning the success of a surgical resection prior to the closure of the incision site. The surgeon may thus have the option to remove additional tissue in a single operation, or institute other prophylactic procedures, based on the results of the analysis.

The present invention may be useful to avoid unnecessary post-surgical radiation therapies in the case of nonmetastatic diseases. Radiation therapy may be called for after surgery if the results of the histopathology examination cannot confirm complete removal of abnormal tissue cells, yet local radiation therapies are associated with considerable morbidity. Using the present invention, where a much higher percentage of the resected tissue may be examined, the pathologist may be able to determine with sufficient confidence that all tissue was removed and thus eliminate the need for radiation therapy.

It is therefore an object of the present invention to provide for an automated method of analyzing tissue sections to discriminate between healthy and cancerous or abnormal tissue.

It is a further object of the present invention to provide for a method of analyzing a large number of slides associated with a particular tissue sample, thereby increasing the percentage of tissue that is analyzed by means of histopathology and improving the accuracy of the histopathology procedure as a result.

It is also an object of the present invention to provide for a method of forming a three-dimensional representation of a tissue sample, displaying the margin of healthy tissue surrounding a lesion.

It is also an object of the present invention to provide a real-time or near real-time analysis of the margins of a resected tissue sample during surgery.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENTS

Figure 1:
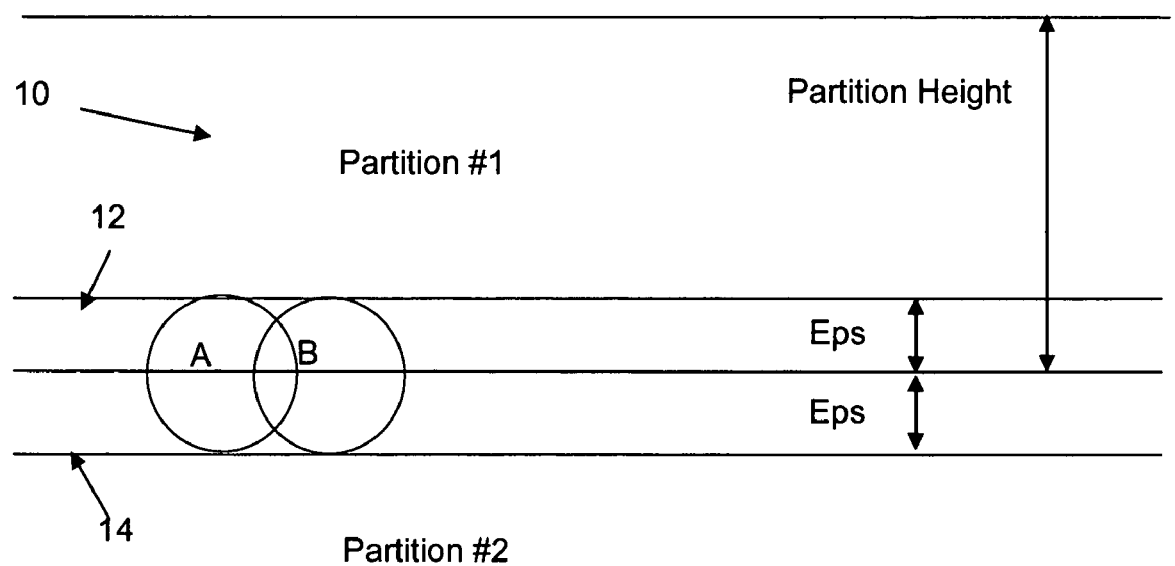
FIG. 1 is a graphical representation of the image partitioning technique according to a preferred embodiment of the present invention.

A preferred embodiment of the present invention will be described as may be employed for the analysis of tissue resections resulting from the surgical treatment of cancerous tumors, as, for example, in the case of breast cancer. It may be understood, however, that the invention is not so limited, and may be applied to the examination of any number of images where disease or abnormal tissue must be identified in a tissue sample. Such applications may include a number of clinical and research applications as will be apparent those of skill in the art.

According to the preferred embodiment, histological sections are first prepared of an excised tissue section in one of various methods as are known in the art. High-resolution digital scans are then taken of the slides using microscopic digital photography. In the preferred embodiment, the resulting photographs have a resolution of at least 54,000 pixels per inch, that is, about 0.5 µm resolution, in order to resolve individual abnormal (or cancerous) cells. Microscopic scanners that are capable of producing such high-resolution images are commercially available. The resulting image file is preferably then compressed according to one of many known compression algorithms, in order to reduce the storage space necessary for this large file. The file is then stored in any convenient digital storage medium, preferably a magnetic computer hard drive. A computer cluster may preferably be used in conjunction with the storage medium, or a single personal or desktop computer may be employed in an alternative embodiment of the present invention.

Once the digital photographs are prepared and stored, the files may be input to the clustering algorithm employed as a part of the preferred embodiment of the present invention. This clustering algorithm is implemented as a software application resident on the computer cluster or computer, as applicable, employed for the purpose of implementing the present invention. In the preferred embodiment, the clustering algorithm employed is a modified version of the DBSCAN (or PDBSCAN) algorithm; it should be noted, however, that other clustering algorithms as are known in the art may be used as the basis for the clustering algorithm of the present invention. The basic DBSCAN algorithm is described in Ester, Martin et al., "A Density-Based Algorithm for Discovering Clusters in Large Spatial Databases with Noise," 2d Intl. Conf. on Knowledge Discovery and Data Mining (1996), which is fully incorporated herein by reference. A parallel-processing version of the DBSCAN algorithm adapted for execution on computer clusters, known as PDBSCAN, is described in XU, Xiaowei, "A Fast Parallel Clustering Algorithm for Large Spatial Databases," *Data Mining and Knowledge Discovery*, 3, 263-290 (Kluwer Academic Publishers 1999), which is also fully incorporated herein by reference. Unless otherwise specified, DBSCAN may be used to refer to both the single-processor DBSCAN and parallel-processing PDBSCAN algorithm herein.

The DBSCAN algorithm, like a number of other known clustering algorithms, relies upon the principle of clustering pixels in an image file based on density. A cluster may be defined as a dense region in a data space, such regions being separated from each other by regions of lower object density. The density of a region is defined by the number of pixels with the same color intensity in a particular region. (For grayscale photographs, the concept of color intensity is replaced by gray intensity, although color is retained in the preferred embodiment for reasons that will be set forth below.) Clusters may have any arbitrary shape and size. The principle behind the DBSCAN algorithm is to group neighboring objects of the image file, or pixel database, into clusters based on a local cluster condition by performing only one scan through the database. By avoiding multiple scans of the data, the speed of the process is greatly increased, making possible the real-time or near real-time applications as will be described below. For this reason, among others, DBSCAN is employed in the preferred embodiment of the present invention. DBSCAN is a very efficient algorithm if the retrieval of the neighborhood of an object is efficiently supported, that is, if the average runtime complexity of a region query is O(log n) for a database of n objects. The overall runtime complexity of the DBSCAN algorithm is O(n log n). If the runtime complexity for retrieval of a neighborhood is O(1), however, such as for low-dimensional raster or grid data, then the overall runtime complexity of the algorithm is only O(n). Since the types of images used in the preferred embodiment fall into this category, it may be seen that the runtime complexity of the DBSCAN algorithm is quite low when applied to the applications of the preferred embodiment of the present invention.

DBSCAN relies on a density-based notion of clusters and is designed to discover clusters of arbitrary shape despite the presence of noise in the data space. The key idea for cluster identification within DBSCAN is that for each point of a cluster, the neighborhood of a given radius (Eps) must contain at least a minimum number of points (MinPts), that is, the density in the neighborhood has to exceed some set threshold. DBSCAN thus requires two input parameters. A simple heuristic for determining the Eps and MinPts parameters in the preferred embodiment is provided in Ester et al.

The cluster condition of DBSCAN can be generalized in the following ways. First, any notion of a neighborhood of an object can be used if it is based on a binary predicate which is symmetric and reflexive. Second, instead of simply counting the objects in a neighborhood, other measures to define the "cardinality" of that neighborhood may be used. A distance-based neighborhood is a natural notion of a neighborhood for point objects. Applying these principles, an algorithmic schema for the DBSCAN clustering algorithm may be represented in pseudo-code as follows:

```
DBSCAN(Database DB)
FOR each object o in DB DO
    IF o is not yet member of some cluster THEN
        create a new cluster C;
        WHILE neighboring objects satisfy the
            cluster condition DO
            add them to C
        ENDWHILE
    ENDIF
ENDFOR
```

To employ the DBSCAN algorithm to data contained in large, high-resolution digital photographs, the first problem encountered is the size of the image database itself. Typical virtual microscopy images of the sort necessary for the application of the preferred embodiment of the present invention contain billions of pixels. As a result, a large amount of time is required for a clustering algorithm such as DBSCAN to retrieve the neighborhood of a pixel for cluster analysis. But since the neighborhood of a pixel is already indexed in the types of simple image files employed in the preferred embodiment, the basic DBSCAN algorithm may be modified in the preferred embodiment of the present invention to exploit this characteristic, and thereby reduce processing time, as explained below.

A second problem associated with the basic DBSCAN algorithm is the need to read a large file space into memory. Again, modifications were made to the basic DBSCAN algorithm in the preferred embodiment of the present invention through the development of a split-and-merge processing method. Specifically, the revised algorithm splits an image into partitions of appropriate size to fit the memory space available. In the preferred embodiment, the width of each partition is the same as the image width, but the height of each partition is defined based on available memory to achieve the best performance.

In order to reduce the complexity of the necessary calculations, the algorithm employed in the preferred embodiment does not consider every pixel of a photograph as one input point or feature in space. Intensity based filtering is used to reduce the number of points in each partition. This filtering depends on color values that are obtained from the transformation of RGB values of each pixel. As a result of a number of experiments, a threshold value is chosen in the preferred embodiment. The mentioned threshold value cannot be fixed in the preferred embodiment since virtual slices show different color spectrum with variety of cancer. The different values of Eps and MinPts (the density parameters of DBSCAN as set forth above) may be manipulated to obtain various segmentation results.

With reference now to FIG. 1, the split-and-merge technique introduced above in the modified version of the DBSCAN algorithm may be described. According to the preferred embodiment of the present invention, each image is divided into a number of smaller partitions small enough to be mapped into the available main memory of the computer or computer cluster employed for execution of the algorithm. In contrast to the original DBSCAN approach, which iteratively queries the neighborhood of a point by using a data structure (Red-Black tree, X-tree, R-tree, M-tree), the approach used in the algorithm of the preferred embodiment exploits the structural nature of the information in the image for efficient neighborhood query. The algorithm first reads into memory a first partition 10 of the image. Whereas the original DBSCAN algorithm starts with an arbitrary point in the photograph pixel database, the algorithm of the preferred embodiment begins at a point that is closest to the origin (preferably, the left-top corner of the photograph). Then the algorithm proceeds to find every cluster in the current partition. A new range query is not fired if a point is reached below border 12, because the neighborhood pixels below this threshold cannot be reached. These points will be put together with the next partition for clustering. Border 12 is (2×Eps) pixels away from bottom edge 14 of first partition 10. In this way the entire image is segmented iteratively.

Again by means of pseudo-code, the algorithm of the preferred embodiment of the present invention using partitioning logic may be represented as follows:

```
SM_DBSCAN(Image IMG)
FOR each partition in IMG
    IF current partition is not the first one
        merge current partition with previous border area
    ENDIF
    FOR each object o in the current partition
        IF o is not yet member of some cluster THEN
            create a new cluster C;
            WHILE neighboring objects satisfy the
                    cluster condition DO
                add them to C
                IF Ck reaches a core point in an expandable set of
                another cluster Ci combine Ck with Ci
            ENDWHILE
            FOR each cluster C in current partition
                IF C has a core point below the border
                    keep it in an expandable set in the memory
                ELSE finalized C
            ENDFOR
        ENDIF
    ENDFOR
ENDFOR
```

While the initial uncompressed size of each digital photograph employed in the preferred embodiment of the present invention is typically in the range of 2-7 GB, the uncompressed size of the resulting image from the algorithm set forth above is typically about 1-2 MB. Files of this size are easily manipulated with an ordinary personal computer. These files may thus be transferred readily to whatever equipment is available to the pathologist for further examination.

Applying the algorithm described herein, and using a personal computer with 1 GB of main memory and an Intel P4 microprocessor operating at a clock speed of 2.4 GHz, the following image sizes were processed by the inventors hereof, which required the memory spaces and resulted in processing times indicated in the following table:

| Image Size | Memory | Time |
| --- | --- | --- |
| 1000 × 700 | 2 MB | 12 s |
| 2000 × 0 | 8.6 MB | 11 s |
| 53708 × 4151 | 669 MB | 15 min |

As may be seen from this data, varying the size of the image partition (which results in a variance in the memory space required in order for the algorithm to run) has an inverse effect on the time necessary for the algorithm to complete execution. This follows from the use of fewer image partitions, and thus fewer iterations of the algorithm. Thus by manipulation of the memory space available on the computer or computer cluster used to execute the program, the operator may reach a desired execution time so long as sufficient memory is available. This may enable the operator to, for example, run the algorithm in real-time or near real-time, such that a tissue sample may be resected, sectioned, scanned, and an image produced by the algorithm of the current invention while surgery is not yet completed.

It may be seen that some criteria must be established in order to determine whether a particular pixel in a digital photograph being processed represents a healthy or abnormal (or cancerous) cell. (This criteria is the "cluster condition" in the pseudo-code set forth above.) Using the preferred embodiment for the purpose of identifying and marking cancerous cells within a specimen of resected tissue, experimental results indicate that color images must be used, as grayscale images do not provide sufficient information from which to distinguish healthy cells from abnormal ones. In the preferred embodiment then, a cell is identified as healthy if its RGB (green) value is found to be equal to or greater than threshold for green value. If the RGB (green) value is less than this, then the cell is still considered to be healthy so long as its RGB (red) value is greater than threshold for red value. Those cells with an RGB (green) value of less than threshold for green value and RGB (red) value of less than or equal to threshold for red value are considered abnormal or cancerous.

The present invention has been described with reference to certain preferred and alternative embodiments that are intended to be exemplary only and not limiting to the full scope of the present invention as set forth in the appended claims.

We claim:

1. A method for processing a high-resolution image, the method comprising the steps of: (a) creating a high-resolution source image of a sample; (b) dividing the source image into a plurality of partitions, wherein the size of each of the plurality of partitions is equal to or less than the size of a computer memory space; (c) transferring a partition of the source image into the computer memory space; (d) creating a partial cluster image from the partition; (e) repeating the transferring of one of the plurality of partitions and the creating a partial cluster image steps for each of the plurality of partitions; and (f) compiling the partial cluster images to produce an assembled cluster image;
    (e) stacking each of the resulting cluster images to produce a three-dimensional cluster image corresponding to the sample;
    (f) displaying the resulting three-dimensional image on a display.

2. The method of claim 1, wherein the assembled cluster image comprises a file size that is smaller than a file size of the source image.

3. The method of claim 1, wherein the assembled cluster image comprises new visually perceptible information derived from the source image.

4. The method of claim 1, wherein the source image comprises a first file format and the assembled cluster image comprises a second file format.

5. The method of claim 2, wherein each of steps (a) through (f) are repeated for a plurality of cross-sectional slices of a sample.

6. The method of claim 5, wherein a sufficient number of the plurality of cross-sectional slides of the sample are employed to represent at least fifty percent of the sample.

7. The method of claim 6, wherein a sufficient number of the plurality of cross-sectional slides of the sample are employed to represent at least ninety percent of the sample.

8. The method of claim 2, wherein steps (c) through (f) are performed using a plurality of computers operating in conjunction.

9. The method of claim 2, wherein the creating a partial cluster image step comprises the steps of identifying pixels corresponding to specific areas in the sample, and calculating boundaries for the regions comprising the pixels corresponding to specific areas.

10. The method of claim 1, wherein the step of displaying the resulting three-dimensional image is performed during a surgical procedure and in which the sample comprises a tissue that was resected during the surgical procedure.

11. An apparatus for producing a cluster image from a digital source image, the apparatus comprising: (a) at least one computer comprising a memory space; (b) a partitioning module resident at the computer and operable to divide the source image into a plurality of partitions, wherein the partitions are smaller than the computer memory space, and further operable to read each partition into the memory space; (c) a clustering module resident at the computer and operable to create a partial cluster image from the partition; and (d) an integration module resident at the computer and operable to merge a plurality of partial cluster images into a complete cluster image; e) a stacking module resident at the computer and operable to stack a plurality of complete cluster images to form a three-dimensional cluster image corresponding to the sample;
(f) a video display in communication with the computer; and (g) a display module resident at the computer and operable to display the three-dimensional cluster image on the video display wherein the display module is further operable to display the three-dimensional image in near real-time during a surgical procedure in which the sample was resected.

12. The apparatus of claim 11, wherein the clustering module and the integration module are operable to produce a complete cluster image comprising a file size that is smaller than that of the source image.

13. The apparatus of claim 12, wherein the computer comprises a computer cluster.

14. The apparatus of claim 11, wherein the cluster module is operable to identify pixels corresponding to specific areas in the source image, and calculate boundaries for the regions comprising the pixels corresponding to the specific areas.

15. The apparatus for producing a three-dimensional cluster image from a plurality of high-resolution source images representing cross-sectional areas of a sample, the apparatus comprising: (a) at least one computer comprising a memory space; (b) a partitioning module resident at the computer and operable to divide each of the source images into a plurality of partitions, wherein the partitions are smaller than the computer memory space; (c) a clustering module resident at the computer and operable to create a partial cluster image from the partition; (d) an integration module resident at the computer and operable to merge a plurality of partial cluster images into a complete cluster image corresponding to a source image; and (e) a stacking module resident at the computer and operable to stack a plurality of complete cluster images to form a three-dimensional cluster image corresponding to the sample;
(f) a video display in communication with the computer; and (g) a display module resident at the computer and operable to display the three-dimensional cluster image on the video display.

16. The apparatus of claim 15, wherein the number of complete cluster images used by the stacking module to form the three-dimensional cluster image corresponds to a number of cross-sectional sample areas comprising more than half of the sample.

17. The apparatus of claim 15, wherein the number of complete cluster images used by the stacking module to form the three-dimensional cluster image corresponds to a number of cross-sectional sample areas comprising more than ninety percent of the sample.

18. The apparatus of claim 15, wherein the display module is further operable to display the three-dimensional image in near real-time during a surgical procedure in which the sample was resected.

* * * * *